(12) United States Patent
Kumar et al.

(10) Patent No.: US 11,207,627 B2
(45) Date of Patent: Dec. 28, 2021

(54) FILTER ASSEMBLY AND SCRUBBER SECTION FOR A CONTINUOUS MINER

(71) Applicant: University of Kentucky Research Foundation, Lexington, KY (US)

(72) Inventors: Ashish Ranjan Kumar, Lexington, KY (US); Steven Schafrik, Lexington, KY (US); William Chad Wedding, Lexington, KY (US); Oscar Velasquez, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 94 days.

(21) Appl. No.: 16/533,395

(22) Filed: Aug. 6, 2019

(65) Prior Publication Data
US 2020/0122072 A1    Apr. 23, 2020

Related U.S. Application Data

(60) Provisional application No. 62/746,711, filed on Oct. 17, 2018.

(51) Int. Cl.
| | |
|---|---|
| *B01D 41/00* | (2006.01) |
| *B01D 45/10* | (2006.01) |
| *E21C 35/22* | (2006.01) |
| *B01D 45/08* | (2006.01) |
| *B01D 45/02* | (2006.01) |

(Continued)

(52) U.S. Cl.
CPC ............ *B01D 45/10* (2013.01); *B01D 45/08* (2013.01); *E21C 35/223* (2013.01); *B01D 45/02* (2013.01); *B01D 45/04* (2013.01); *B01D 47/06* (2013.01)

(58) Field of Classification Search
CPC ........ B01D 45/10; B01D 45/08; B01D 47/06; B01D 2275/10; B01D 45/02; B01D 45/04; E21C 35/223
See application file for complete search history.

(56) References Cited

U.S. PATENT DOCUMENTS

| | | | | |
|---|---|---|---|---|
| 1,521,348 A | * | 12/1924 | Ambruster | B01D 45/08 55/444 |
| 1,806,400 A | * | 5/1931 | Joseph | B01D 45/08 261/112.2 |

(Continued)

FOREIGN PATENT DOCUMENTS

| | | |
|---|---|---|
| DE | 2416195 A1 | 10/1974 |
| JP | H09239224 A | 9/1997 |

(Continued)

OTHER PUBLICATIONS

English machine translation of JP09239224.
(Continued)

*Primary Examiner* — Dung H Bui
(74) *Attorney, Agent, or Firm* — Stites & Harbison PLLC; Warren D. Schickli

(57) ABSTRACT

A filter assembly includes a first screen, defining a first flow passageway, a second screen, defining a second flow passageway, and a third screen defining a third flow passageway. The second screen is positioned between the first screen and the third screen. The first flow passageway is aligned with the third flow passageway and the second flow passageway is offset from the first flow passageway and the third flow passageway.

10 Claims, 5 Drawing Sheets

(51) Int. Cl.
    *B01D 47/06* (2006.01)
    *B01D 45/04* (2006.01)

(56) References Cited

U.S. PATENT DOCUMENTS

| | | | | |
|---|---|---|---|---|
| 2,083,764 A * | 6/1937 | Weisgerber | ............ | B01D 45/08 55/322 |
| 3,141,910 A * | 7/1964 | Pearce | ............ | B01D 47/06 261/108 |
| 3,325,973 A * | 6/1967 | Illingworth | ............ | B01D 46/10 95/154 |
| 3,606,738 A * | 9/1971 | Kraus, Jr. | ............ | B01D 45/08 55/446 |
| 3,659,402 A | 5/1972 | Alliger et al. | | |
| 3,799,512 A * | 3/1974 | Raybon | ............ | B01D 45/10 261/29 |
| 3,834,135 A * | 9/1974 | Jordan | ............ | B01D 45/08 55/444 |
| 3,876,396 A | 4/1975 | Arnold et al. | | |
| 4,061,478 A | 12/1977 | Hartwick | | |
| 4,321,064 A * | 3/1982 | Vargo | ............ | B01D 45/08 95/272 |
| 4,380,353 A * | 4/1983 | Campbell | ............ | B01D 47/06 299/12 |
| 4,717,404 A * | 1/1988 | Fore | ............ | B01D 45/08 55/357 |
| 4,787,920 A | 11/1988 | Richard | | |
| 4,799,944 A | 1/1989 | Dixon et al. | | |
| 4,885,010 A * | 12/1989 | Rich | ............ | B01D 47/024 96/271 |
| 4,891,052 A * | 1/1990 | Belin | ............ | B01D 45/08 55/429 |
| 4,938,787 A * | 7/1990 | Simmerlein-Erlbacher | ............ | F01N 3/0211 96/298 |
| 4,955,990 A * | 9/1990 | Napadow | ............ | B01D 45/08 95/216 |
| 4,992,085 A * | 2/1991 | Belin | ............ | B01J 8/0065 55/444 |
| 5,041,146 A * | 8/1991 | Simmerlein-Erlbacher | ............ | B01D 45/10 96/57 |
| 5,178,654 A | 1/1993 | Cowley et al. | | |
| 5,300,131 A * | 4/1994 | Richard | ............ | B01D 45/08 96/297 |
| 5,391,220 A * | 2/1995 | Patterson | ............ | B01D 45/08 55/462 |
| 5,713,970 A * | 2/1998 | Raring | ............ | B01D 45/10 55/511 |
| 5,809,909 A * | 9/1998 | Hoskinson | ............ | B01D 45/08 110/215 |
| 5,972,062 A | 10/1999 | Zimmermann | | |
| 6,071,419 A * | 6/2000 | Beier | ............ | B01D 46/12 210/767 |
| 6,095,095 A | 8/2000 | Alexander et al. | | |
| 6,312,504 B1 * | 11/2001 | Both | ............ | E21C 35/223 95/214 |
| 6,409,805 B1 | 6/2002 | Beier et al. | | |
| 6,514,303 B2 | 2/2003 | Lukac et al. | | |
| 6,565,625 B2 * | 5/2003 | Hearld | ............ | B01D 50/002 55/DIG. 46 |
| 6,951,077 B1 | 10/2005 | Higginbotham | | |
| 7,314,495 B2 | 1/2008 | Dullien et al. | | |
| 7,332,007 B2 * | 2/2008 | Both | ............ | E21C 35/223 55/385.5 |
| 7,585,345 B2 | 9/2009 | Smasal et al. | | |
| 7,758,666 B2 | 7/2010 | Meerpohl | | |
| 8,016,121 B2 | 9/2011 | Schmitz et al. | | |
| 8,236,249 B2 | 8/2012 | Doring et al. | | |
| 9,114,347 B2 | 8/2015 | Eyers et al. | | |
| 9,182,131 B1 * | 11/2015 | Prasser | ............ | B01D 50/00 |
| 9,266,047 B2 * | 2/2016 | Piszczek | ............ | B01D 45/16 |
| 9,388,688 B2 | 7/2016 | Both et al. | | |
| 9,682,336 B2 * | 6/2017 | Lucas | ............ | B01D 50/002 |
| 9,884,280 B2 | 2/2018 | Kuennen | | |
| 2013/0047562 A1 * | 2/2013 | Paris | ............ | B01D 45/08 55/308 |
| 2013/0327218 A1 * | 12/2013 | Izzi | ............ | B01D 46/0082 95/281 |
| 2014/0366798 A1 * | 12/2014 | Katefidis | ............ | B01D 46/0019 118/326 |
| 2015/0210946 A1 * | 7/2015 | Kinoshita | ............ | C10L 9/08 201/17 |
| 2018/0126318 A1 * | 5/2018 | Schubert | ............ | B01D 47/027 |
| 2020/0001217 A1 * | 1/2020 | Savage | ............ | B01D 46/10 |

FOREIGN PATENT DOCUMENTS

JP    2004261706 A    9/2004
KR    101769538 B1    8/2017

OTHER PUBLICATIONS

English machine translation of DE2416195.
English machine translation of JP2004261706.
English machine translation of KR101769538.

* cited by examiner

FILTER ASSEMBLY AND SCRUBBER SECTION FOR A CONTINUOUS MINER

RELATED APPLICATION

This application claims priority to U.S. Provisional Patent Application 62/746,711, filed Oct. 17, 2018, which is hereby incorporated by reference in its entirety.

TECHNICAL FIELD

This document relates generally to the filtering field and, more particularly, to a new and improved filter assembly and a scrubber section for a continuous miner incorporating that filter assembly.

BACKGROUND

Dust generated on underground mechanized coal-mining faces is a health and safety hazard. Continuous miners deployed underground usually have an integrated flooded-bed dust scrubber mounted onto the machine that arrests the generated dust from close to the face and cleanses the air around it. However, the impingement screen might get clogged depending on the coal seam being worked. This necessitates the cleaning of the screen which in turn, reduces the overall availability of the scrubber and, hence the continuous miner.

This document relates to a new and improved filter assembly as well as to a scrubber section for a continuous miner incorporating that filter assembly. The novel non-clogging filter assembly incorporates three aluminum filter screens and represents a significant advance in the art.

SUMMARY

In accordance with the purposes and benefits described herein, a new and improved filter assembly is provided. That filter assembly comprises a first screen defining a first flow passageway, a second screen defining a second flow passageway and a third screen defining a third flow passageway. The second screen is positioned between the first screen and the third screen. The first flow passageway is aligned with the third flow passageway and the second flow passageway is offset from the first flow passageway and the third flow passageway.

More particularly, in one or more of the possible embodiments, the first screen is spaced from the second screen by a distance $D_1$ and the second screen is spaced from the third screen by a distance $D_2$ where $D_1 \geq D_2$. In addition, the first flow passageway includes a first plurality of slits formed the first screen. The second flow passageway includes a second plurality of slits formed in the second screen. The third flow passageway includes a third plurality of slits formed in the third screen.

The first plurality of slits may all be parallel. The second plurality of slits may all be parallel. The third plurality of slits may all be parallel. The first, second and third plurality of slits may all have longitudinal axes running parallel to one another.

Each slit of the first plurality of slits may have a width W. Similarly, each slit of the second plurality of slits and the third plurality of slits may also have a width W. Further, the second flow passageway may be offset by an offset distance OD from the first flow passageway and the third flow passageway where OD=W.

In at least one of the many possible embodiments of the filter assembly, the ratio of $D_1$ to $D_2$ is 3:2. Further, the ratio of W to $D_1$ is 2:1. In addition, the first screen, the second screen and the third screen all have a thickness T where the ratio of W to T is 4:1.

In one or more of the many possible embodiments of the filter assembly, the width W is greater than 6.0 mm. In still other embodiments the width W is equal to 6.0 mm.

The filter assembly may also include a plurality of fasteners and cooperating spacers that secure the first screen, the second screen and the third screen together.

In accordance with yet another aspect, a new and improved scrubber section is provided for a continuous miner. That scrubber section comprises an air duct having an air intake at a first end and an air discharge at a second end and a filter assembly in the air duct between the first end and the second end. As set forth above, that filter assembly includes a first screen defining a first flow passageway, a second screen defining a second flow passageway and a third screen defining a third flow passageway. The second screen is positioned between the first screen and the third screen. The first flow passageway is aligned with the third flow passageway and the second flow passageway is offset from the first flow passageway and the third flow passageway.

The scrubber section further includes a water spray jet configured to spray water over the first screen, the second screen and the third screen whereby accumulation of dust on the first screen, the second screen and the third screen is prevented.

In addition, the scrubber section further includes an air fan in the air duct downstream from the filter assembly. That air fan functions to draw air into the air duct through the air intake past the filter assembly and to discharge that air from the air discharge.

In addition, the scrubber further includes a demister. The demister is provided in the air duct between the air filter assembly and the air fan. The demister functions to capture mist from the airstream and maintain that mist and entrained dirt within the scrubber section of the continuous miner.

In the following description, there are shown and described several preferred embodiments of the filter assembly and the related scrubber section for a continuous miner. As it should be realized, the filter assembly and the scrubber section are capable of other, different embodiments and their several details are capable of modification in various, obvious aspects all without departing from the filter assembly and scrubber section as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the filter assembly and the scrubber section and together with the description serve to explain certain principles thereof.

Reference will now be made in detail to the present preferred embodiments of the filter assembly and scrubber section, examples of which are illustrated in the accompanying drawing figures.

DETAILED DESCRIPTION

Figure 1:
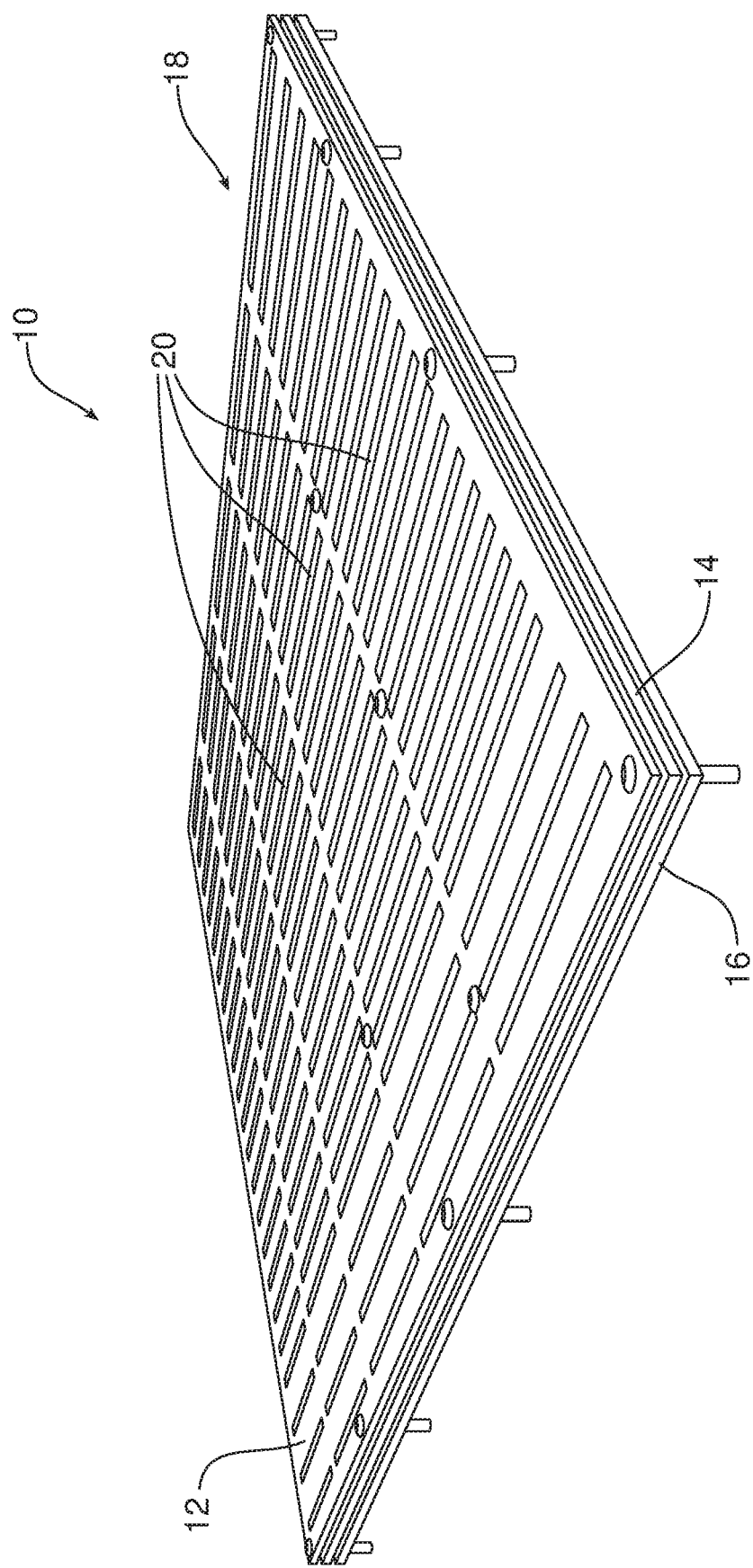
FIG. 1 is a perspective view of the filter assembly including the first, second and third screens.
Figure 2:
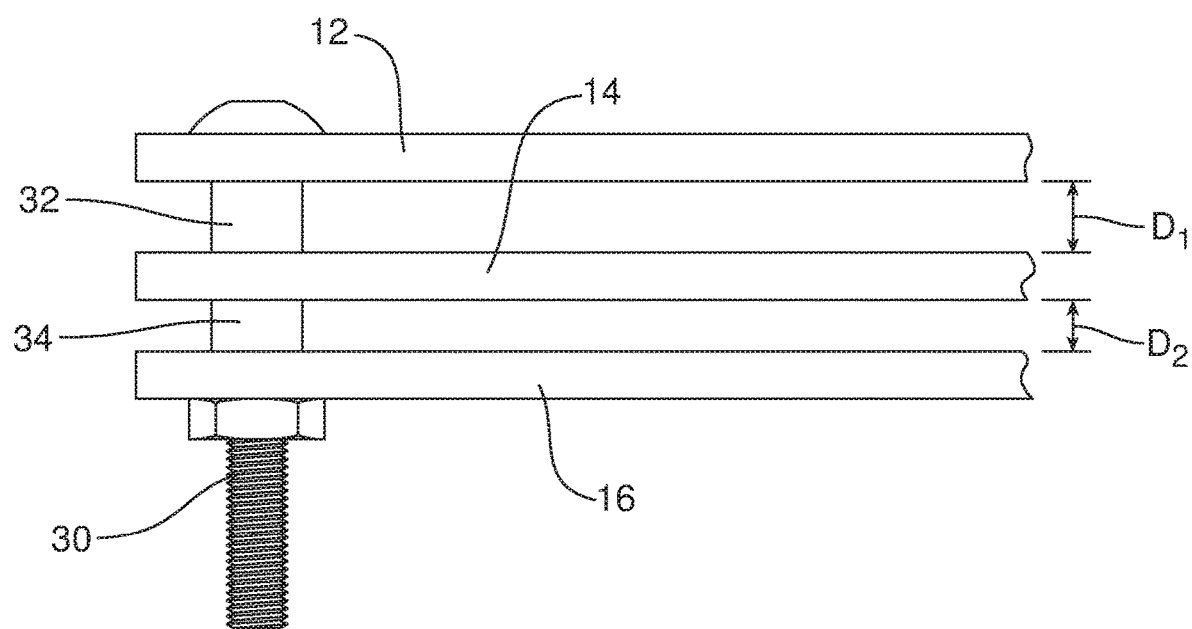
FIG. 2 is a detailed side elevational view illustrating one of the fasteners and cooperating spacers utilized to secure the three screens of the filter assembly together and hold them in a desired spatial configuration.

Reference is now made to FIGS. 1 and 2 illustrating a new and improved filter assembly 10 including a first screen 12, a second screen 14 and a third screen 16. Each of the screens 12, 14, 16 may be made from aluminum or other appropriate material.

Figure 4:
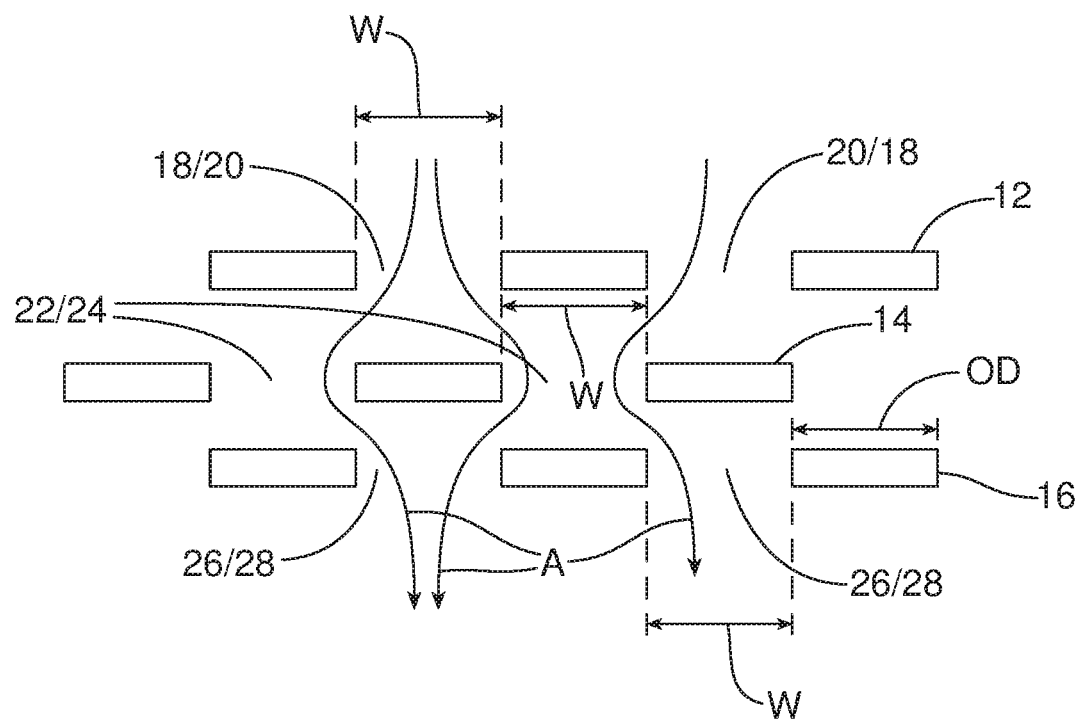
FIG. 4 is a schematic detailed illustration of the relative orientation of the first, second and third plurality of slits in the respective first, second and third screens of the filter assembly.

As best illustrated in FIGS. 1 and 4, the first screen 12 includes a first flow passageway 18 comprising a first plurality of slits 20. In the illustrated embodiment, the first plurality of slits 20 are elongated and parallel to one another.

The second screen 14 includes a second flow passageway 22 taking the form of a second plurality of slits 24. In the illustrated embodiment the second plurality of slits 24 are all elongated and parallel to one another.

Similarly, the third screen 16 includes a third flow passageway 26. In the illustrated embodiment the third flow passageway 26 comprises a third plurality of slits 28. In the illustrated embodiment those third plurality of slits 28 are all elongated and parallel to one another.

As further illustrated in FIG. 4, the second screen 14 is positioned between the first screen 12 and the third screen 16. Further, the first flow passageway 18 and all of the first plurality of slits 20 are aligned with the third flow passageway 26 and all of the third plurality of slits 28 while the second flow passageway 22 and all of the second plurality of slits 24 are offset from the first flow passageway/first plurality of slits and the third flow passageway/third plurality of slits.

As should be appreciated, the resulting filter assembly 10 is blind and does not allow for air to flow straight through the screens (note action arrows A). The offsetting of the second flow passageway 22/second plurality of slits 24 from the first flow passageway 18/first plurality of slits 20 and third flow passageway 26/third plurality of slits 28 forces dust laden air passing through the filter assembly 10 to make sharp turns. The dust particles cannot change directions rapidly and, accordingly impact one of the screens 12, 14, 16 and are separated from the air.

Figure 3:
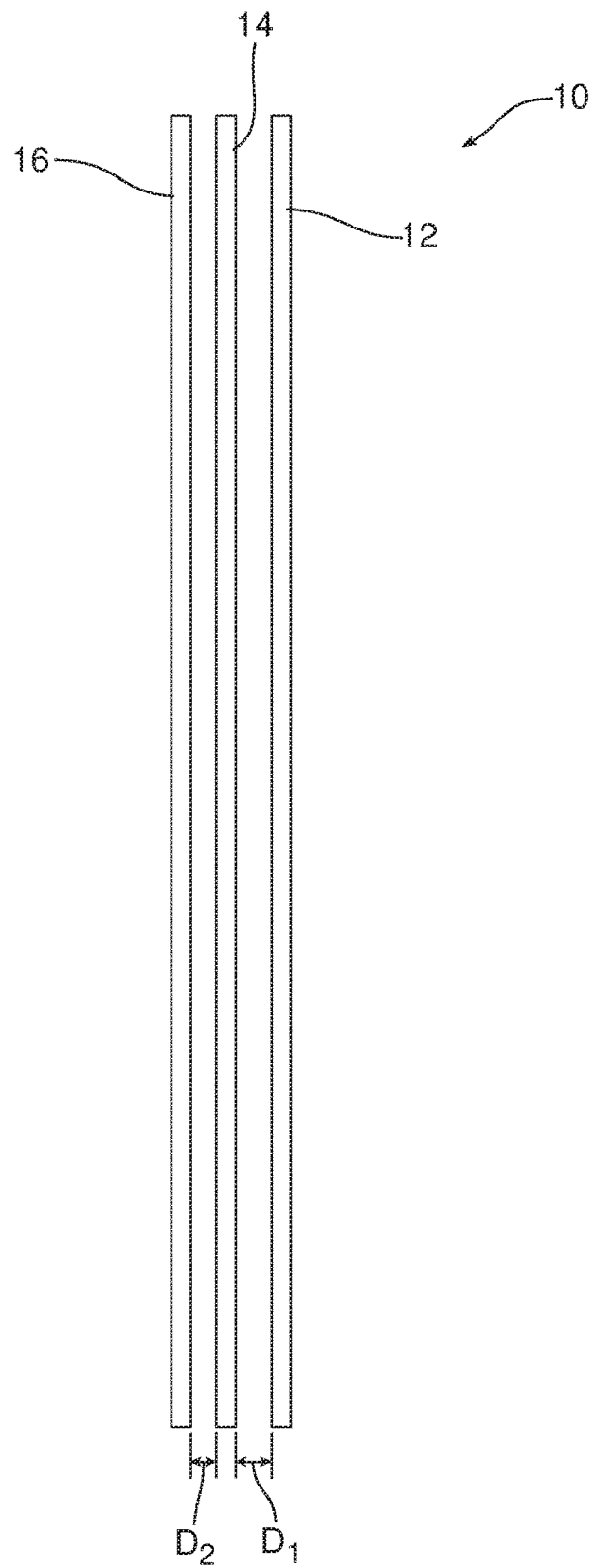
FIG. 3 is a schematic edge-on illustration illustrating the spacing provided between the three screens of the filter assembly shown in FIGS. 1 and 2.

As best illustrated in FIGS. 2 and 3, the first screen 12 is spaced from the second screen 14 by a distance $D_1$ and the second screen is spaced from the third screen 16 by a distance $D_2$ where $D_1 \geq D_2$. In order to achieve this configuration, the filter assembly 10 includes a plurality of fasteners 30 and cooperating spacers 32, 34 securing the screens 12, 14, 16 together. See FIG. 2. In the illustrated embodiment, the fasteners 30 comprise screws and cooperating nuts and the spacers 32 are longer than the spacers 34. More particularly, the spacers 32 have a length equal to $D_1$ while the spacers 34 have a length equal to distance $D_2$. In one particularly useful embodiment of the filter assembly, the ratio of $D_1$ to $D_2$ is 3:2. In other embodiments, $D_1 > D_2$ In one particularly useful embodiment of the filter assembly illustrated in FIG. 4, each slit of the first plurality of slits 20 has a width W. In some embodiments each slit of the second plurality of slits 24 and the third plurality of slits 28 also has a width W. Further, in one particularly useful embodiment of the filter assembly, the second flow passageway 22/second plurality of slits 24 are offset by an offset distance OD from the first flow passageway 18/first plurality of slits 20 and the third flow passageway 26/third plurality of slits 28 where OD=W.

In one particularly useful embodiment of the filter assembly, the ratio of W to $D_1$ is 2:1. Further, each of the first screen 12, second screen 14 and third screen 16 has a thickness T where the ratio of W to T is 4:1. In one particularly useful embodiment of the filter assembly, the width W is greater than 6.0 mm. In one useful embodiment of the filter assembly 10, the width W is equal to 6.0 mm. In such an embodiment, $D_1$ may equal 3.0 mm, $D_2$ may equal 2.0 mm, OD may equal 6 mm and T may equal 1.5 mm.

Figure 5:
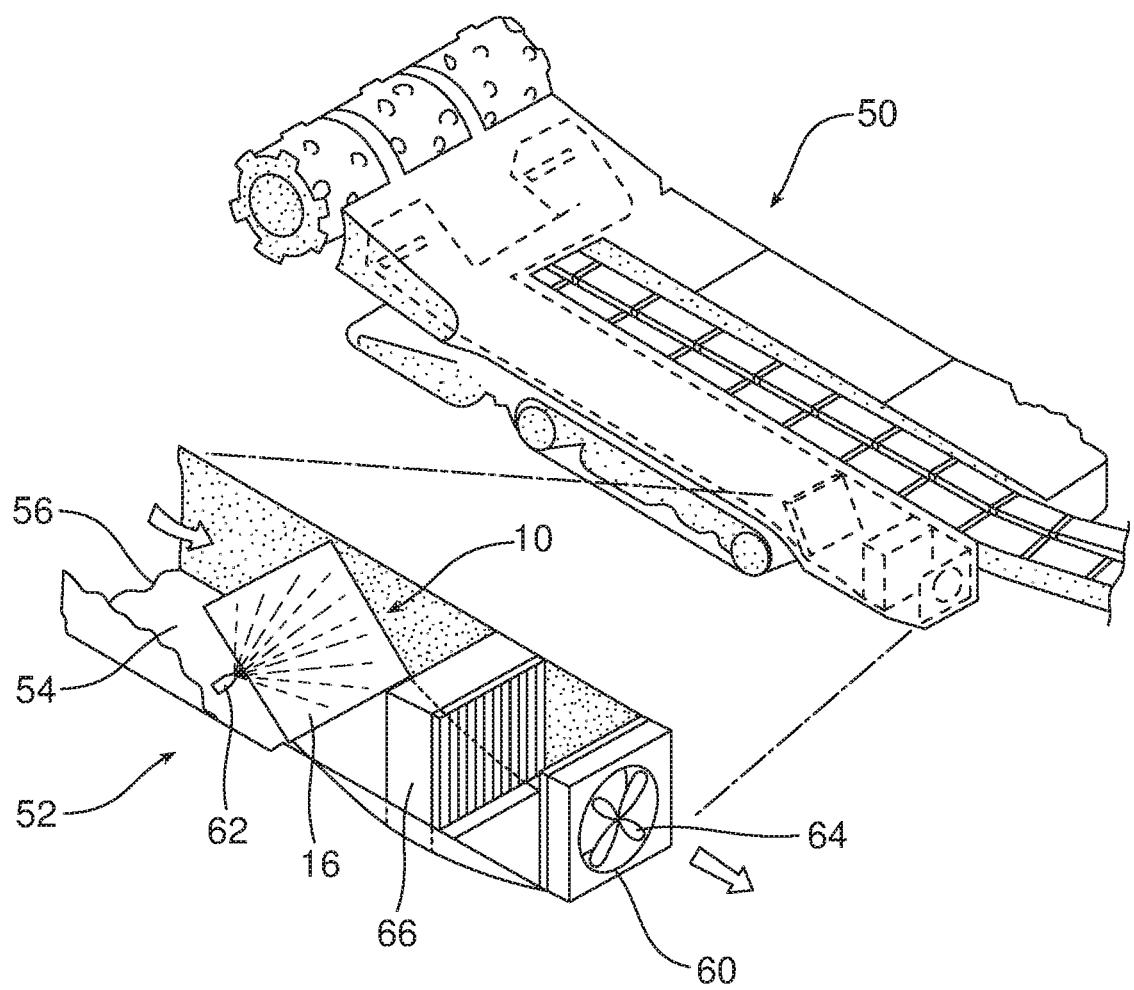
FIG. 5 is a partially schematic and perspective view of the scrubber section for a continuous miner incorporating the filter assembly illustrated in FIGS. 1-4.

Reference is now made to FIG. 5 which illustrates a continuous miner 50 including a new and improved scrubber section 52. That scrubber section 52 comprises an air duct 54 having an air intake 56 at a first end and an air discharge 60 at a second end. The filter assembly 10 is provided in the air duct between the air intake 56 at the first end and the air discharge 60 at the second end.

The scrubber section 52 also includes a water spray jet 62 configured to spray water over the three screens 12, 14, 16 of the filter assembly 10 whereby accumulation of dust on the first, second and third screens is prevented. As a result, the filter assembly 10 remains clog free at all times.

The scrubber section 52 also includes an air fan 64 in the air duct 54 downstream from the filter assembly 10. The air fan functions to draw air into the air duct through the air intake 56 then through and past the filter assembly 10 before pushing that air through the air discharge 60.

Still further, the scrubber section 52 also includes a demister 66 in the air duct 54 between the filter assembly 10 and the air fan 64. Demister 66 functions to remove mist from the airstream along with any dust particles entrained within the mist before that air passes through the air fan for discharge through the air discharge 60.

The foregoing has been presented for purposes of illustration and description. It is not intended to be exhaustive or to limit the embodiments to the precise form disclosed. Obvious modifications and variations are possible in light of the above teachings. For example, FIG. 2 clearly illustrates an embodiment of the filter assembly including fasteners 30 and spacers 32, 34. In other embodiments, the screens 12, 14, 16 may be held together by welding or otherwise bonded together and the spacers may be separate components or integral portions of the screens. Further, the illustrated embodiment of the filter assembly 10 includes three screens 12, 14, 16. It should be appreciated that the filter assembly 10 may include more than three screens and still incorporate the offset screen construction described in this document. All such modifications and variations are within the scope of the appended claims when interpreted in accordance with the breadth to which they are fairly, legally and equitably entitled.

What is claimed:

1. A filter assembly, comprising:
    a first screen defining a first flow passageway;
    a second screen defining a second flow passageway; and
    a third screen defining a third flow passageway wherein said second screen is positioned between said first screen and said third screen, said first flow passageway is aligned with said third flow passageway and said second flow passageway is offset from said first flow passageway and said third flow passageway wherein said first screen is spaced from said second screen by a distance $D_1$ and said second screen is spaced from said third screen by a distance $D_2$ where $D_1 \geq D_2$; wherein said first flow passageway includes a first plurality of slits formed in said first screen; wherein said second flow passageway includes a second plurality of slits formed in said second screen; wherein said third flow passageway includes a third plurality of slits formed in said third screen; wherein said first plurality of slits are parallel; wherein said second plurality of slits and said third plurality of slits are also parallel; wherein each slit of said first plurality of slits has a width W; wherein the ratio of W to $D_1$ is 2:1; and wherein said width W>6.0 mm.

2. The filter assembly of claim 1, wherein said second flow passageway is offset by an offset distance OD from said first flow passageway and said third flow passageway where OD=W.

3. The filter assembly of claim 2, wherein the ratio of $D_1$ to $D_2$ is 3:2.

4. The filter assembly of claim 1, wherein said first screen, said second screen and said third screen have a thickness T wherein the ratio of W to T is 4:1.

5. The filter assembly of claim 4 wherein said width W=6.0 mm.

6. The filter assembly of claim 1, further including a plurality of fasteners and cooperating spacers securing said first screen, said second screen and said third screen together.

7. A scrubber section for a continuous miner, comprising:
an air duct having an air intake at a first end and an air discharge at a second end; and
a filter assembly in said air duct between said first end and said second end, wherein said filter assembly includes a first screen defining a first flow passageway, a second screen defining a second flow passageway and a third screen defining a third flow passageway wherein said second screen is positioned between said first screen and said third screen, said first flow passageway is aligned with said third flow passageway and said second flow passageway is offset from said first flow passageway and said third flow passageway wherein said first screen is spaced from said second screen by a distance $D_1$ and said second screen is spaced from said third screen by a distance $D_2$ where $D_1 \geq D_2$; wherein said first flow passageway includes a first plurality of slits formed in said first screen; wherein said second flow passageway includes a second plurality of slits formed in said second screen; wherein said third flow passageway includes a third plurality of slits formed in said third screen; wherein said first plurality of slits are parallel; wherein said second plurality of slits and said third plurality of slits are also parallel; wherein each slit of said first plurality of slits has a width W; wherein the ratio of W to $D_1$ is 2:1; and wherein said width W>6.0 mm.

8. The scrubber section of claim 7, further including further including a water spray jet configured to spray water over said first screen, said second screen and said third screen whereby accumulation of dust on said first screen, said second screen and said third screen is prevented.

9. The scrubber section of claim 8, further including an air fan in said air duct downstream from said filter assembly whereby air is drawn into said air duct through said air intake past said filter assembly and then discharged from said air discharge.

10. The scrubber of claim 9, further including a demister in said air duct between said filter assembly and said air fan.

* * * * *